(12) United States Patent
El-Shall et al.

(10) Patent No.: US 8,020,567 B2
(45) Date of Patent: *Sep. 20, 2011

(54) PALLADIUM-CONTAINING NANOSCALE CATALYSTS

(75) Inventors: Mohamed Samy El-Shall, Richmond, VA (US); Sarojini Deevi, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,807

(22) Filed: Jan. 10, 2011

(65) Prior Publication Data

US 2011/0126847 A1    Jun. 2, 2011

Related U.S. Application Data

(62) Division of application No. 11/252,773, filed on Oct. 19, 2005, now Pat. No. 7,879,128.

(60) Provisional application No. 60/621,543, filed on Oct. 25, 2004.

(51) Int. Cl.
*A24B 15/18* (2006.01)

(52) U.S. Cl. ........... 131/334; 502/325; 502/339; 131/57

(58) Field of Classification Search .................. 502/103, 502/339, 400; 423/579; 131/334, 57
See application file for complete search history.

(56) References Cited

U.S. PATENT DOCUMENTS

| | | | |
|---|---|---|---|
| 5,322,075 A | 6/1994 | Deevi et al. | |
| 5,591,368 A | 1/1997 | Fleischhauer et al. | |
| 5,934,289 A | 8/1999 | Watkins et al. | |
| 6,053,176 A | 4/2000 | Adams et al. | |
| 6,787,500 B2 * | 9/2004 | Ito et al. | 502/180 |
| 7,017,585 B2 | 3/2006 | Li et al. | |
| 7,879,128 B2 | 2/2011 | El-Shall et al. | |
| 2004/0140296 A1 | 7/2004 | Lis | |
| 2004/0168695 A1 * | 9/2004 | Snaidr et al. | 131/365 |

(Continued)

FOREIGN PATENT DOCUMENTS

EP    0792688 A1    9/1997

(Continued)

OTHER PUBLICATIONS

Baker, Richard R., "Mechanism of Smoke Formation and Delivery," Recent Advances in Tobacco Science, vol. 6, pp. 184-224 (1980).

(Continued)

*Primary Examiner* — Stuart Hendrickson
*Assistant Examiner* — Richard M Rump
(74) *Attorney, Agent, or Firm* — Buchanan Ingersoll & Rooney PC

(57) ABSTRACT

A method of making palladium-containing nanoscale catalyst particles comprising subjecting a starting material to laser energy so as to form a vapor and condensing the vapor so as to form the catalyst particles. The catalyst comprises nanoscale particles of palladium and/or palladium oxide incorporated in and/or on nanoscale particles of a metal or metal oxide. The nanoscale catalyst, which can be incorporated in the tobacco cut filler, cigarette wrapper and/or cigarette filter of a cigarette, is useful for low-temperature and near-ambient temperature catalysis. The nanoscale catalyst can convert carbon monoxide and nitric oxide that are found in mainstream smoke to carbon dioxide and nitrogen, respectively. The nanoscale catalyst may also be incorporated into a hydrocarbon conversion reactor, into a vehicle exhaust emissions system, into a laser, into a fuel cell or used in an air filter or for emissions reduction in the cold starting of an automobile engine.

13 Claims, 7 Drawing Sheets

U.S. PATENT DOCUMENTS

2004/0173229 A1     9/2004    Crooks et al.
2005/0166934 A1     8/2005    Deevi et al.

FOREIGN PATENT DOCUMENTS

EP          1439147 A1     7/2004
FR          2848784 A1     6/2004

OTHER PUBLICATIONS

Baker, Richard R., "Variation of the Gas Formation Regions within a Cigarette Combustion Coal during the Smoking Cycle," Beiträge zur Tabakforschung International, vol. 11, No. 1, pp. 1-17 (1981).

Bera, Parthasarathi et al. "Studies on $Cu/CeO_2$ : A New NO Reduction Catalyst," Journal of Catalysis, 186:36-44 (1999), Academic Press.

Bera, Parthasarathi et al. "Ionic Dispersion of Pt and Pd on $CeO_2$ by Combustion Method: Effect of Metal-Ceria Interaction on Catalytic Activities for NO Reduction and CO and Hydrocarbon Oxidation" Journal of Catalysis, 196:293-301 (2000), Academic Press.

El-Shall, M. et al., "Synthesis of Nanoscale Metal Oxide Particles Using Laser Vaporization/Condensation in a Diffusion Cloud Chamber", J. Phys. Chem., 98 (13), Mar. 24, 1994, pp. 3067-3070.

Flytzani-Stephanopoulos, Maria, "Nanostructured Cerium Oxide 'Ecocatalysts'" MRS Bulletin, (Nov. 2001), 26(11):885-889.

Fu, Qi et al. "Nanostructured $Au-CeO_2$ Catalysts for Low-Temperature Water-Gas Shift" Catalysis Letters 77(1-3):87-95 (2001), Plenum Publishing Corporation.

Katz, Joseph L., "Condensation of a Supersaturated Vapor. I. The Homogeneous Nucleation of the n—Alkanes," The Journal of Chemical Physics, vol. 52, No. 9, May 1, 1970, pp. 4733-4748.

Li, Yue et al. "Low-Temperature Water-Gas Shift Reaction over Cu- and Ni-Loaded Cerium Oxide Catalysts" Applied Catalysis B: Environmental 27 (2000) 179-191, Elsevier Science B.V.

Liu, Wei et al. "Total Oxidation of Carbon Monoxide and Methane over Transition Metal-Fluorite Oxide Composite Catalysts" Journal of Catalysis, 153:304-316 (1995) Academic Press.

Liu, Wei et al. Transition Metal-Promoted Oxidation Catalysis by Fluorite Oxides: A Study of CO Oxidation over $Cu-CeO_2$ The Chemical Engineering Journal, 64 (1996)' 283-294, Elsevier Science S.A.

Skårman, Björn et al., "Carbon Monoxide Oxidation on Nanostructured $CuO_x/CeO_2$ Composite Particles Characterized by HREM, XPS, XAS, and High-Energy Diffraction" Journal of Catalysis, 211:119-133 (2002) Elsevier Science (USA).

Tschöpe, Andreas et al. "Processing and Structural Evolution of Nanocrystalline Cu-CeO2-x Catalysts," Mater. Sci. Eng. A204, (1995) pp. 267-271, Elsevier Science S.A.

Ying, Jackie Y. et al., "Gas-Phase Synthesis of Nonstoichiometric Nanocrystalline Catalysts," Advanced Catalysts and Nanostructured Materials—Modern Synthetic Methods, ed. William R. Moser, Academic Press, (1996) 231-257.

International Search Report and Written Opinion mailed Mar. 31, 2006 for PCT/IB2005/003677.

International Preliminary Report on Patentability mailed May 10, 2007 for PCT/IB2005/003677.

\* cited by examiner

US 8,020,567 B2

PALLADIUM-CONTAINING NANOSCALE CATALYSTS

RELATED APPLICATIONS

This application is a divisional of U.S. patent application Ser. No. 11/252,773, entitled PALLADIUM-CONTAINING NANOSCALE CATALYSTS, filed on Oct. 19, 2005 now U.S. Pat. No. 7,879,128, which claims priority under 35 U.S.C. §119(e) to U.S. Provisional Application No. 60/621,543, entitled PALLADIUM-CONTAINING NANOSCALE CATALYSTS, filed on Oct. 25, 2004, the entire content of each is hereby incorporated by reference.

SUMMARY

Provided is a method of making a palladium-containing nanoscale catalyst comprising (i) placing a starting material in a reaction chamber, subjecting the starting material to a beam of laser energy to form a vapor and condensing the vapor so as to form first nanoscale particles and second nanoscale particles, wherein the first nanoscale particles comprise palladium and/or an oxide of palladium, the second nanoscale particles comprise an element other than palladium, and the first nanoscale particles are supported on the second nanoscale particles to form the palladium-containing nanoscale catalyst.

A method of making a cigarette further comprises (i) incorporating the palladium-containing nanoscale catalyst in and/or on at least one of tobacco cut filler, a cigarette wrapper comprising web-filler material and a cigarette filter comprising filter material; (ii) providing the tobacco cut filler to a cigarette making machine to form a tobacco column; and (iii) placing the cigarette wrapper around the tobacco column to form a tobacco rod of a cigarette. Cigarettes comprising a palladium-containing catalyst are provided.

The starting material, which can comprise one or more targets, comprises palladium (e.g., palladium and/or palladium oxide) and an element other than palladium. Preferred palladium based catalysts comprise from about 1 to 99% by weight palladium, more preferably from about 2 to 50% by weight palladium.

Nanoscale support particles comprise a second element, which is selected from the group consisting of Mg, Al, Si, Ti, V, Cr, Mn, Fe, Co, Ni, Cu, Zn, Ge, Y, Zr, Nb, Mo, Ru, Rh, Ag, Sn, Ce, Pr, La, Hf, Ta, W, Re, Os, Ir, Pt and Au. Preferred nanoscale support particles comprise aluminum, silicon, zirconium and/or cerium (e.g., elemental aluminum, elemental silicon, aluminum oxide, zirconium oxide and/or cerium oxide).

The palladium-containing nanoscale catalyst comprises particles having an average size of less than about 100 nm. The palladium-containing nanoscale catalyst comprises first nanoscale particles, which have a preferred average particle size of less than about 100 nm, more preferably less than about 10 nm, and second nanoscale particles which have a preferred average particle size of less than about 100 nm. First nanoscale particles are supported by second nanoscale particles.

According to an embodiment, laser energy (e.g., the second harmonic of a Nd YAG laser at 532 nm with 15 to 100 mJ/pulse) strikes the starting material.

The reaction chamber in which the palladium-containing nanoscale catalyst is formed has an upper portion and a lower portion and the temperature maintained in the upper portion is less than the temperature maintained in the lower portion (e.g., at least about 20° C. less) such that the condensing occurs in the upper portion. Preferably, palladium and the second element condense in the gas phase to form the palladium-containing nanoscale catalyst.

The target can be vaporized by energy from the laser while adding to the reaction chamber an inert carrier gas selected from the group consisting of helium and argon or a reactive gas mixture comprising an inert carrier gas and an oxygen-containing gas selected from the group consisting of oxygen, water vapor and air (e.g., a reactive gas mixture comprising 95% helium and 5% oxygen). In an embodiment, the target is vaporized while the reaction chamber is free of oxygen. The chamber pressure during the formation of the palladium-containing nanoscale catalyst can range from about $10^{-3}$ Torr to about 760 Torr and higher.

In a preferred embodiment, prior to incorporating the catalyst in and/or on the at least one of tobacco cut filler, cigarette wrapper and cigarette filter, the palladium-containing nanoscale catalyst is heated (i.e., calcined) at a temperature of at least about 200° C. The catalyst can be calcined in an atmosphere comprising oxygen (e.g., 85% argon, 20% oxygen) to oxidize the nanoscale particles of palladium and/or oxidize the second nanoscale particles prior to incorporating the catalyst.

The palladium-containing nanoscale catalyst is preferably capable of acting as both as a catalyst and as an oxidant for the conversion of carbon monoxide to carbon dioxide. According to preferred embodiments, the palladium-containing nanoscale catalyst is incorporated in an amount effective to convert at least 5%, more preferably at least 25%, of the carbon monoxide in mainstream tobacco smoke to carbon dioxide and/or convert at least 5%, more preferably at least 25%, of the nitric oxide in mainstream tobacco smoke to nitrogen. For example, according to an embodiment, the palladium-containing nanoscale catalyst can be incorporated in an amount effective to convert at least 5% of the carbon monoxide in mainstream tobacco smoke to carbon dioxide at a temperature of less than about 225° C. and convert at least 50% of the carbon monoxide in mainstream smoke to carbon dioxide at a temperature of less than about 260° C. According to a further embodiment, the palladium-containing nanoscale catalyst is incorporated in an amount effective to convert at least 5% of the carbon monoxide in mainstream tobacco smoke to carbon dioxide at a temperature of less than about 75° C. and convert at least 50% of the carbon monoxide in mainstream smoke to carbon dioxide at a temperature of less than about 125° C.

The palladium-containing catalyst can be incorporated in the tobacco cut filler (e.g., along the length of the tobacco rod), cigarette paper and/or cigarette filter by spraying, dusting or immersion. The catalyst can be incorporated without using a solvent or other liquid. In a preferred embodiment, the palladium-containing nanoscale catalyst is incorporated into at least one cigarette component by forming and depositing the catalyst directly on the component using LVCC.

In a preferred embodiment, the palladium-containing nanoscale catalyst is incorporated in web filler material to form a catalyst-modified web-filler material, which is incorporated in cigarette wrapper used to form a cigarette. A preferred ratio, in weight percent, of the palladium-containing nanoscale catalyst to the web-filler material in the cigarette wrapper is from about 0.1 to 3. A preferred cigarette comprises up to about 100 mg of the palladium-containing nanoscale catalyst in the cigarette wrapper.

The cigarette wrapper can comprise a second wrapper (e.g., outer wrapper) such that a preferred ratio, in weight percent, of palladium-containing catalyst to web-filler material in the second wrapper is less than about 0.1. A preferred second wrapper is catalyst-free.

A method of incorporating the palladium-containing catalyst in the web-filler material comprises forming an aqueous slurry of the palladium-containing catalyst and the web-filler material and drying the slurry to form the catalyst modified web-filler. The catalyst modified web filler can optionally be calcined and/or ball milled prior to incorporating the catalyst modified web filler into a cigarette wrapper.

Also provided is a method of oxidizing carbon monoxide to carbon dioxide comprising contacting the palladium-containing nanoscale catalyst with a gas containing carbon monoxide, the gas being selected from the group consisting of mainstream and/or sidestream cigarette smoke, vehicle exhaust emission, a gas used in a laser, a gas used in a fuel cell and ambient air undergoing air filtration.

DETAILED DESCRIPTION OF PREFERRED EMBODIMENTS

Figure 1:
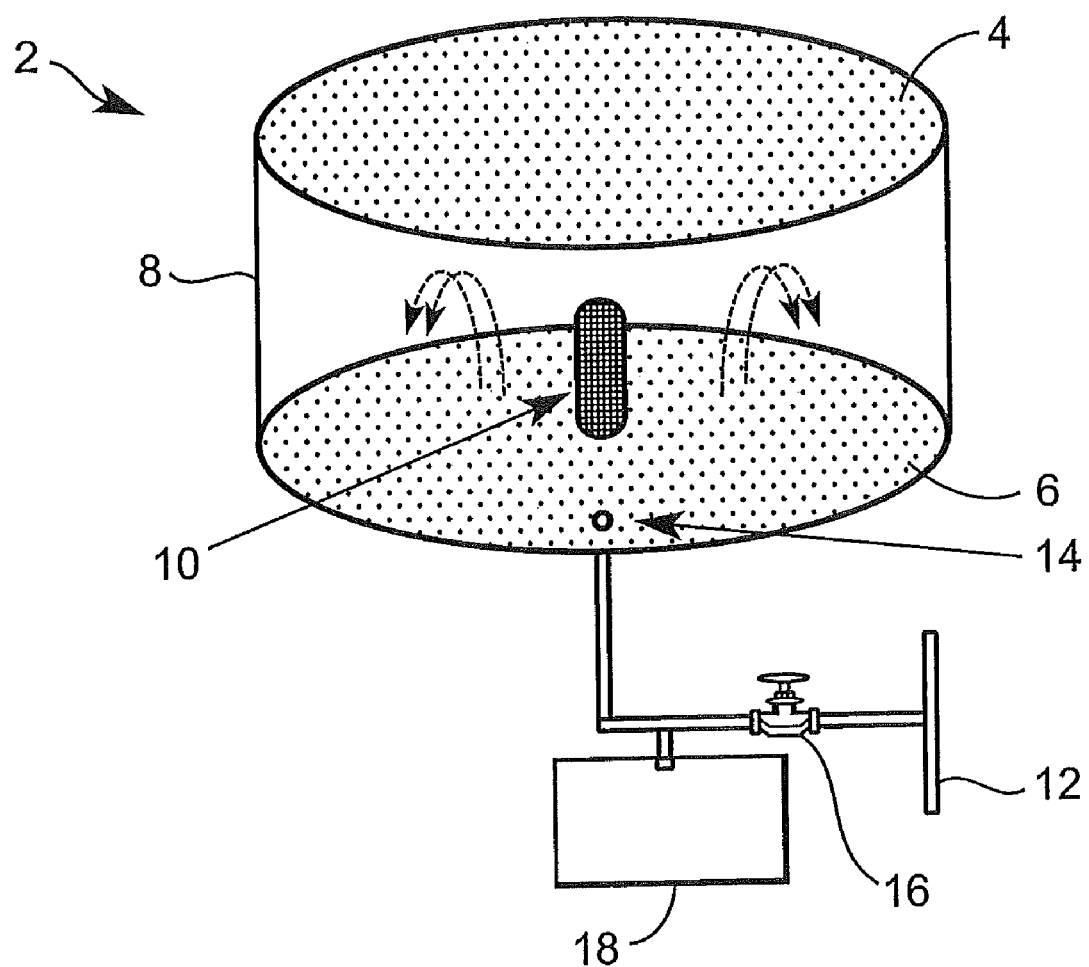
FIG. 1 shows an apparatus for depositing palladium-containing catalysts via laser vaporization and controlled condensation (LVCC).

According to a first embodiment, palladium-containing catalysts, which can catalyze the conversion of carbon monoxide to carbon dioxide, can be incorporated into one or more components of a cigarette such as tobacco cut filler, cigarette wrapper and cigarette filters. In particular, the palladium-containing catalysts are useful for low-temperature or near-ambient temperature oxidation of carbon monoxide. By incorporating the palladium-containing catalysts into a component of a cigarette, the amount of carbon monoxide in mainstream smoke can be reduced. The palladium-containing catalysts comprise nanoscale particles of palladium and/or palladium oxide supported on nanoscale particles. The nanoscale support particles comprise a material other than palladium. By "nanoscale" is meant that the particles have an average particle diameter of less than a micron. Preferably, the nanoscale particles comprising palladium have an average particle size of less than about 100 nm, more preferably less than about 50 nm, most preferably less than about 10 nm.

The palladium-containing catalysts comprise nanoscale support particles such that the nanoscale particles of palladium and/or palladium oxide are incorporated in and/or on the nanoscale support particles. The support particles comprise at least one element other than palladium (e.g., Mg, Al, Si, Ti, V, Cr, Mn, Fe, Co, Ni, Cu, Zn, Ge, Y, Zr, Nb, Mo, Ru, Rh, Ag, Sn, Ce, Pr, La, Hf, Ta, W, Re, Os, Ir, Pt and Au).

Preferably, the nanoscale support particles comprise an element selected from the group consisting of aluminum, silicon, zirconium and cerium. According to an embodiment, the nanoscale support particles can comprise elemental aluminum, silicon, zirconium and/or cerium and/or the oxides thereof. The nanoscale support particles preferably have an average particle size of less than about 100 nm, preferably less than about 50 nm.

Palladium-containing catalysts can be prepared by laser vaporization/controlled condensation (LVCC) from a target comprising palladium. Laser vaporization/controlled condensation is an ablative process that uses one or more starting materials that provide the desired catalyst composition. With LVCC, the starting material(s) (e.g., target) is exposed to laser energy so as to form a vapor and the vapor is condensed to form the palladium-containing catalyst. Using laser vaporization/controlled condensation it is possible to form a supported palladium-containing nanoscale catalyst directly from a single target that comprises palladium (e.g., palladium metal and/or palladium oxide) and one or more elements other than palladium. A supported palladium-containing catalyst comprises particles of palladium and/or palladium oxide that are incorporated in and/or on nanoscale support particles.

By "incorporated in" is meant that palladium and/or palladium oxide comprises a second phase that is dispersed at least partially throughout the matrix of the nanoscale support. By "incorporated on" is meant that palladium and/or palladium oxide comprises a second phase that is dispersed on an exposed surface of the nanoscale support.

According to a preferred embodiment, particles comprising palladium and particles comprising the support are formed simultaneously and co-deposited to form the palladium-containing catalyst. The palladium-containing catalyst can be deposited directly on a component of a cigarette or, more preferably, the palladium-containing catalyst can be formed, collected, and subsequently incorporated in and/or on one or more components of a cigarette.

In an ablative process, a region of the target absorbs incident energy from the energy (e.g., laser) source. The incident energy can comprise, for example, pulsed laser energy. This absorption of energy and subsequent heating of the target causes the target material to ablate from the surface of the target into a plume of atomic and ionic species (i.e., vapor). The atomic and ionic species can condense into nanoscale particles by vapor phase collisions with each other and with an inert or reactive gas. The condensed nanoscale particles comprising palladium and the nanoscale particles comprising a material other than palladium can co-deposit to form the palladium-based catalyst.

The amount of energy required to vaporize the target will vary depending on process variables such as the temperature of the target, the pressure of the atmosphere surrounding the target, and material properties such as the thermal and optical properties of the target. The target is formed of (or coated with) a consumable material to be removed, i.e., target material. With laser ablation, target material is progressively removed from the target by physical erosion.

The target material may be any suitable precursor material with a preferred form being solid or powder materials composed of pure materials or a mixture of materials. Such materials are preferably solids at room temperature and/or not susceptible to chemical degradation such as oxidation in air. Preferably, the starting material comprises a pressed powder target. In preferred embodiments, the target material comprises pressed powders of one or more elements (e.g., metals) and/or oxides thereof (e.g., metal oxides).

The laser energy preferably vaporizes the target material directly, without the target material undergoing significant liquid phase transformation. The types of lasers that can be used to generate the laser energy can include ion lasers, UV excimer lasers, and Nd-YAG lasers. The laser beam can be scanned across the surface of the target material in order to improve the uniformity of target ablation and to improve the homogeneity of the atomic and nanometer-scale particles.

The method combines the advantages of pulsed laser vaporization with controlled condensation in a diffusion cloud chamber under well-defined conditions of pressure and temperature. The method can employ pulsed laser vaporization of at least one target into a selected gas mixture within a chamber. Typically, the chamber includes two horizontal metal plates separated by an insulating sidewall. The target is placed in the chamber, e.g., on the lower plate, and the chamber is filled with a gas such as an inert gas or a mixture of an inert gas and a reactive gas. For example, the inert gas can comprise helium, argon or mixtures thereof, and the reactive gas can comprise oxygen. A temperature gradient is maintained between the top and bottom plates, which creates a steady convection current that can be enhanced by using a heavy gas such as argon and/or by using above atmospheric pressure conditions in the chamber. Details of suitable chambers can be found in The Journal of Chemical Physics, Vol. 52, No. 9, May 1, 1970, pp. 4733-4748, the disclosure of which is hereby incorporated by reference.

A schematic illustration of an LVCC chamber 2 suitable for production of palladium-containing catalysts is shown in FIG. 1. Two circular horizontal stainless steel or aluminum plates denoted as the top cold plate 4 and the bottom hot plate 6 are separated by an insulating (e.g., glass or other dielectric) sidewall 8 with about a 6 inch outer diameter. A bulk target 10 is set on the bottom plate 6. The target may optionally be contained in a target holder. The target holder may optionally be rotated by connecting it to a motor. The reaction chamber 2 is connected to a gas supply 12 through a gas inlet hole 14 situated in the bottom plate. The gas supply is isolated from the chamber by a control valve 16. The pressure in the chamber and within the gas lines is monitored through an optional Barocel pressure sensor and readout 18, which are shown coupled into the gas line. The chamber and the gas line can be evacuated to a base pressure of approximately $10^{-3}$ Torr.

During each deposition run the chamber is filled with either a high purity (e.g., 99.99%) carrier gas such as He or Ar or a reactive gas mixture, which contains a known composition of a reactive gas (e.g., $O_2$) seeded within a carrier gas. For example, the reactive gas mixtures may be oxygen in helium, or oxygen in argon. Prior to each deposition run the chamber is preferably filled and evacuated several times with the carrier gas to ensure removal of any impurities from the chamber. During ablation of the target material, the ejected atoms interact with the gas mixture in the chamber.

The energy source is positioned external to the chamber such that the energy beam enters the chamber through a chamber wall. The vapor can be created in the chamber by focusing onto the target the output of a laser such as the second harmonic of a Q-switched Nd-YAG laser (wavelength 532 nm; 10 ns pulse duration). Typically the laser operates at 30 Hz and delivers a power of about 15-100 mJ/pulse onto the target. Samples of palladium-containing catalysts were prepared by flowing either pure He gas or a reactive gas mixture comprising a known volume percent of $O_2$ in He. The oxygen volume percent in the chamber during LVCC synthesis was varied from about 0 to 50% $O_2$. The samples discussed below are identified by the composition of the target material from which they were made as well as by the amount of oxygen (e.g., 0% $O_2$, 5% $O_2$, 50% $O_2$, etc.) that was provided to the chamber during ablation of the target material.

Laser vaporization produces a high-density vapor within a very short time, typically $10^{-8}$ sec, in a directional jet that allows directed deposition. The collisions between the particles ejected from the target undergo Brownian motion during the gas-to-particle conversion and result in the formation of particles that comprise the target material(s). After nanoscale particles have condensed from the vapor phase, both diffusion and convection can aid in removal of the particles away from the nucleation zone before they can grow into larger particles. Laser vaporization is possible from several different targets simultaneously or a single compound target, yielding a palladium-containing catalyst comprising palladium and/or palladium oxide optionally incorporated in and/or a nanoscale particle support.

As mentioned above, convection current can be created within the chamber. The convection current can be achieved by maintaining a temperature gradient between the top plate and the bottom plate. For example, referring to FIG. 1, the top plate 4 can be cooled such as by circulating liquid nitrogen within the top plate and the bottom plate 6 can be kept at a higher temperature (e.g., room temperature) or the bottom plate 6 can be heated such as by circulating heating fluid or attaching an electrical heater to the bottom plate and the top plate can be kept at a lower temperature (e.g., room temperature). Preferably, the top plate is cooled by circulating liquid nitrogen in fluid passages (not shown) in the top plate. In either case, the top plate is kept at a temperature significantly lower than the bottom plate, which makes the top plate the condensation or deposition plate. Preferably the temperature gradient between the top plate and the bottom plate is at least about 20° C., more preferably at least 50° C. Nichrome heating wires wrapped around the glass sidewall heat the glass sidewall can reduce deposition on the sidewall and also promote a uniform temperature gradient between the two plates. The temperatures of the plates are monitored using thermocouples attached to each plate and connected in parallel to a temperature readout.

The temperature of the chamber atmosphere decreases as the top plate is approached resulting in maximum super-saturation developing in the upper half of the chamber. The higher the super-saturation, the smaller the size of the nucleus required for condensation of the particles that are ablated from the target. Changing the temperature gradient may enhance the super-saturation in the chamber. Convection plays a role in diffusion of the particles out of the nucleation zone before they grow larger in size. Convection within the chamber may be enhanced by increasing the temperature gradient between the top and bottom plates and/or by using a heavier carrier gas (e.g., argon as compared to helium). In producing a palladium-containing catalyst, the vapor produced can be cooled or condensed via vapor phase collisions with an inert gas, reactive gas and/or the cold plate.

During laser ablation, if the density of the ablated particles is sufficiently low, and their relative velocities sufficiently high, particles (e.g., atoms, clusters and charged particles) from the target material can travel through the gas until they impact the surface of the cold plate or a component of a cigarette that is positioned on the cold plate where they can coalesce. On the other hand if the density of the ablated particles is sufficiently high, and their relative velocities sufficiently small, particles from the target can aggregate in the gas phase, which can then deposit on the cold plate or deposit on a component of a cigarette that is positioned on the cold plate.

Without wishing to be bound by theory, at an ablation pressure lower than about $10^{-3}$ Torr the mean free path of ablated species is sufficiently long that ablated species arrive at the cold plate without undergoing many gas phase collisions. Thus at lower reactor pressures, ablated material can deposit on a surface of the cold plate and diffuse and coalesce with each other to form nanoscale particles after alighting on the cold plate. At higher pressures, such as pressures above about $10^{-3}$ Torr, the collision frequency in the gas phase of ablated species is significantly higher and nucleation and growth of the ablated species to form nanoscale particles can occur in the gas phase before alighting on the surface of the cold plate. Thus, at higher pressures ablated material can form a palladium-containing catalyst in the gas phase, which can deposit as discrete particles.

After a typical run the energy source is turned off, the chamber is brought to room temperature and the sample is collected and stored. By controlling the temperature gradient, the chamber pressure and the laser power, which can be used to determine the number density of the atoms released in the vapor phase, (e.g., on the order of $10^{14}$ atoms per pulse), the process of condensation and consequently the size and composition of the palladium-containing catalyst can be controlled.

The operating pressure in the chamber is preferably greater than about $10^{-3}$ Torr, and more preferably about 760 Torr. The temperature gradient can be adjusted by altering the temperatures of the top and/or bottom plates of the chamber. The temperature of the upper plate is preferably between about $-150°$ C. and $30°$ C. The temperature of the lower plate is preferably between about $20°$ C. and $150°$ C. It should be appreciated that although the LVCC apparatus described above has a top plate (condensation plate) that is cooled relative to a bottom plate, this geometry can be reversed (e.g., the top plate can be heated relative to the bottom plate).

The method is preferably performed with an inert environment of helium and/or argon at a pressure greater than atmospheric pressure in the chamber, which reduces the possibility of atmospheric contamination during the synthesis. However, as indicated above, the reaction may also be carried out at atmospheric pressure or at pressures lower than atmospheric pressure.

An added advantage of the method is the capability of preparing selected metal oxide particles by precisely introducing known concentrations of a reactive (e.g., oxidizing) gas such as oxygen into the reaction chamber. The introduction of reactive gases into the chamber during the deposition process allows material ablated from the target to combine with the reactive gases to obtain oxide nanoscale particles. Thus, in reactive ablation the chamber includes a small proportion of a reactive gas, such as air, oxygen, water vapor, etc., which reacts with the atoms of the target material to form oxide particles. A reactive gas can oxidize a surface of the target to form an oxide on an exposed surface thereof (e.g., a native oxide), which is ablated to form nanoscale oxide particles, or a reactive gas can interact with ablated material from the target to form nanoscale oxide particles of the target material in the gas phase.

The target can consist essentially of palladium or palladium oxide and at least one other element in addition to palladium (e.g., Mg, Al, Si, Ti, V, Cr, Mn, Fe, Co, Ni, Cu, Zn, Ge, Y, Zr, Nb, Mo, Ru, Rh, Ag, Sn, Ce, Pr, La, Hf, Ta, W, Re, Os, Ir, Pt and Au). The element in addition to palladium can be in the form of an elemental metal or a metal oxide. By providing a target comprising palladium and a second element, a supported palladium-containing catalyst can be formed in situ. Preferably, the second element is Al, Si, Zr and/or Ce.

Preferred palladium-containing catalysts comprise nanoscale palladium and/or palladium oxide particles supported on nanoscale particles of aluminum, aluminum oxide, silicon, silicon oxide, zirconium oxide and/or cerium oxide. A preferred support is a binary metal oxide support.

Cerium oxide (e.g., $CeO_{2-x}$)($x>0$) is a preferred support in the palladium-containing catalyst because cerium oxide can act both as a support in synergy with the palladium and/or palladium oxide and an active metal oxide oxidation catalyst. An equilibrium between $Ce^{3+}$ and $Ce^{4+}$ can result in an exceptionally high oxygen storage and release capacity that enables catalytic combustion of CO by providing oxygen directly to catalytically active sites. Also, cerium oxide is less susceptible to deactivation from water vapor and more resistant to sintering than other oxides such as aluminum oxide.

By way of example, a palladium-cerium oxide catalyst may be formed by reactive ablation. A palladium-cerium oxide catalyst may be formed by reactively ablating a palladium-cerium target in a chamber comprising argon and oxygen. The palladium-cerium oxide catalyst comprises nanoscale particles that comprise palladium (e.g., Pd and/or PdO) that are incorporated in nanoscale particles of the oxide of cerium.

As an alternative to reactive ablation, palladium-containing catalysts can be formed via ablation from a target comprising palladium and cerium oxide in an inert atmosphere. In an alternative method, a palladium-cerium oxide catalyst may be formed by ablating a pressed powder target comprising palladium metal and cerium oxide in a chamber comprising argon.

The microstructure of the palladium-containing catalyst can be controlled using ablation. Particle density, phase distribution and the extent and morphology of crystalline (versus amorphous) phases can be controlled by varying, for example, the chamber pressure, laser energy and temperatures of the hot and cold plates. The composition of a supported palladium-containing catalyst, including the ratio of the palladium and/or palladium oxide to the nanoscale support can be controlled by controlling the composition of the target.

The palladium-containing nanoscale catalysts comprise nanoscale palladium and/or palladium oxide that is incorporated in and/or on a nanoscale support of a metal or metal oxide. The LVCC method was used to prepare palladium-containing nanoscale particles using targets that were prepared by pressing a mixture of commercially-available palladium powder and one or more commercially available powders comprising one or more metals or metal oxides.

The compositions of the nanoscale particles described herein are defined as the composition of the target from which they are derived. Targets comprising from about 1 to 99 wt. % palladium metal were used. The balance of the target composition comprised commercially available powders of one or more metals or metal oxides.

Advantageously, ablation allows for dry, solvent-free, simultaneous formation and deposition of palladium-containing catalysts. According to an embodiment, the palladium-containing catalysts can be used to catalyze and/or oxidize the conversion of carbon monoxide to carbon dioxide in the mainstream smoke of a cigarette.

An embodiment relates to a method of making a cigarette comprising the steps of: (i) placing a starting material in a reaction chamber, subjecting the starting material to a beam of laser energy to form a vapor and condensing the vapor so as to form first nanoscale particles and second nanoscale particles, wherein the first nanoscale particles comprise palladium and/or an oxide of palladium, the second nanoscale particles comprise an element other than palladium, and the first nanoscale particles are supported on the second nanoscale particles to form the palladium-containing nanoscale catalyst; (ii) incorporating the palladium-containing nanoscale catalyst in and/or on at least one of tobacco cut filler, a cigarette wrapper comprising web-filler material and a cigarette filter comprising filter material; (iii) providing the tobacco cut filler to a cigarette making machine to form a tobacco column; and (iv) placing the cigarette wrapper around the tobacco column to form a tobacco rod of a cigarette.

According to a preferred method, the palladium-containing catalysts are incorporated in tobacco cut filler, cigarette wrapper and/or a cigarette filter that are used to form a cigarette. By incorporating a palladium-containing catalyst into one or more components of a cigarette, the palladium-containing catalyst can reduce the amount of carbon monoxide in mainstream smoke during smoking via catalysis of carbon monoxide oxidation to carbon dioxide. The palladium-containing catalyst can also reduce the total amount of particulate matter (e.g., tar) issuing from a cigarette during smoking.

As used herein, a catalyst is capable of affecting the rate of a chemical reaction, e.g., a catalyst can increase the rate of oxidation of carbon monoxide to carbon dioxide without participating as a reactant or product of the reaction. An oxidant is capable of oxidizing a reactant, e.g., by donating oxygen to the reactant, such that the oxidant itself is reduced. A reducing agent is capable of reducing a reactant, e.g., by receiving oxygen from the reactant, such that the reducing agent itself is oxidized.

While not wishing to be bound by theory, it is believed that during smoking the incorporated palladium-containing catalyst can catalyze CO to reduce the level of CO in the mainstream and/or sidestream smoke by reaction with oxygen ($O_2$) in the gas stream of the cigarette to form $CO_2$ according to the equation $2CO+O_2=2CO_2$. It is also believed that subsequent to the catalytic reaction, the palladium-containing catalysts may also act as an oxidant, which can oxidize CO in the absence of oxygen, in the gas stream to reduce the level of CO in the mainstream and/or sidestream smoke.

Preferably, the palladium-containing catalysts are incorporated in tobacco cut filler, cigarette wrapper and/or a cigarette filter in an amount effective to reduce the concentration in mainstream smoke of carbon monoxide and/or nitric oxide by at least 5% (e.g., by at least 15%, 20%, 25%, 30%, 35%, 40%, 45%, 50%, 55%, 60%, 65%, 70%, 75%, 80%, 85%, 90% or 95%). Preferably, the catalyst is present in an amount effective to convert at least 5% of the carbon monoxide in mainstream smoke to carbon dioxide at a temperature of less than about 225° C. or less than about 100° C., and to convert at least 50% of the carbon monoxide in mainstream smoke to carbon dioxide at a temperature of less than about 260° C. or less than about 150° C. In a most preferred embodiment, the palladium-containing catalyst is incorporated in one or more components of a cigarette in an amount effective to convert at least 5% of the carbon monoxide in mainstream smoke to carbon dioxide at a temperature of less than about 75° C., and to convert at least 50% of the carbon monoxide in mainstream smoke to carbon dioxide at a temperature of less than about 125° C. Without wishing to be bound by theory, it is believed that the synergy between nanoscale particles comprising palladium and nanoscale support particles provide an effective (e.g., low temperature) catalyst/oxidant for carbon monoxide.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing smoke from the combustion through the mouth end of the cigarette. The cigarette may also be smoked by other means. For example, the cigarette may be smoked by heating the cigarette and/or heating using electrical heater means as described in commonly-assigned U.S. Pat. Nos. 6,053,176; 5,934,289; 5,591,368 or 5,322,075.

The term "mainstream" smoke refers to the mixture of gases and/or aerosol passing down the tobacco rod and issuing through the filter end, i.e., the amount of smoke issuing or drawn from the mouth end of a cigarette during smoking of the cigarette. The mainstream smoke contains smoke that is drawn in through both the lighted region.

Several factors contribute to the formation of carbon monoxide in a cigarette. In addition to the constituents in the tobacco, the temperature and the oxygen concentration in a cigarette during combustion can affect the formation and reaction of carbon monoxide and carbon dioxide. The total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$, are about the same. At 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that the palladium-containing catalysts can target the various reactions that occur in different regions of the cigarette during smoking. The palladium-containing catalyst can convert CO to $CO_2$ in the absence or presence of an external source of oxygen.

First, the combustion zone is the burning zone of the cigarette produced during smoking of the cigarette, usually at the lighted end of the cigarette. The temperature in the combustion zone ranges from about 700° C. to about 950° C., and the heating rate can be as high as 500° C./second. The concentration of oxygen is low in the combustion zone because oxygen is being consumed in the combustion of tobacco to produce carbon monoxide, carbon dioxide, water vapor and various organic compounds. The low oxygen concentration coupled with the high temperature leads to the reduction of carbon dioxide to carbon monoxide by the carbonized tobacco. In this region, the palladium-containing catalysts can convert carbon monoxide to carbon dioxide via an oxidation and/or catalysis mechanism. The combustion zone is highly exothermic and the heat generated is carried to the pyrolysis/distillation zone.

The pyrolysis zone is the region behind the combustion zone, where the temperature ranges from about 200° C. to about 600° C. The pyrolysis zone is where most of the carbon monoxide is produced. The major reaction is the pyrolysis (i.e., the thermal degradation) of the tobacco that produces carbon monoxide, carbon dioxide, smoke components and charcoal using the heat generated in the combustion zone. There is some oxygen present in this region, and thus the palladium-containing catalysts may catalyze the oxidation of carbon monoxide to carbon dioxide. The catalytic reaction begins at about 50° C. and reaches maximum activity around 150 to 300° C. In the pyrolysis zone the palladium-containing catalysts can also directly oxidize the conversion of CO to $CO_2$.

In the condensation/filtration zone the temperature ranges from ambient to about 150° C. The major process in this zone is the condensation/filtration of the smoke components. Some amount of carbon monoxide and carbon dioxide diffuse out of the cigarette and some oxygen diffuses into the cigarette. The partial pressure of oxygen in the condensation/filtration zone does not generally recover to the atmospheric level. In the condensation/filtration zone, the palladium-containing catalysts can catalyze the conversion of carbon monoxide to carbon dioxide.

During the smoking of a cigarette, carbon monoxide in mainstream smoke flows toward the filter end of the cigarette. As carbon monoxide travels within the cigarette, oxygen diffuses into and carbon monoxide diffuses out of the cigarette through the wrapper. After a typical 2-second puff of a cigarette, CO is concentrated in the periphery of the cigarette, i.e., near the cigarette wrapper. Due to diffusion of $O_2$ into the cigarette, the oxygen concentration is also high in the peripheral region. Airflow into the tobacco rod is largest near the combustion zone at the periphery of the smoking article and is approximately commensurate with the gradient of temperature, i.e., higher airflow is associated with larger temperature gradients. In a typical cigarette, the highest temperature gradient is from the combustion zone (>850-900° C.) axially toward the filter end of the cigarette. Within a few millimeters behind the combustion zone the temperature drops to near ambient. Further information on airflow patterns, the formation of constituents in cigarettes during smoking and smoke formation and delivery can be found in Richard R. Baker, "Mechanism of Smoke Formation and Delivery", Recent Advances in Tobacco Science, vol. 6, pp. 184-224, (1980) and Richard R. Baker, "Variation of the Gas Formation Regions within a Cigarette Combustion Coal during the Smoking Cycle", Beiträge zur Tabakforschung International, vol. 11, no. 1, pp. 1-17, (1981), the contents of both are incorporated herein by reference.

The quantity, location and distribution in a cigarette of the palladium-containing catalyst can be selected as a function of the temperature and airflow characteristics exhibited during smoking in order to adjust, e.g., increase or maximize the conversion rate of CO to $CO_2$. A palladium-containing catalyst can be selected that operates in a given temperature range, and a component of a cigarette (e.g., tobacco cut filler, wrapper and/or filter) can be manufactured into which the catalyst is incorporated in order to coincide with the appropriate temperature for operation of the catalyst/oxidant.

The palladium-containing catalyst may be incorporated into the tobacco rod of a cigarette. The catalyst may be provided continuously along the length of a tobacco rod or at discrete locations along the length of a tobacco rod. Furthermore, the palladium-containing catalysts may be homogeneously or non-homogeneously distributed along the length of a tobacco rod. The palladium-containing catalysts may be added to cut filler tobacco stock supplied to a cigarette-making machine or incorporated directly in a tobacco rod prior to wrapping a cigarette wrapper around the cigarette rod.

One embodiment provides a method for forming the palladium-containing catalysts and then depositing the palladium-containing catalysts on and/or incorporating them in tobacco cut filler, which is then used to form a cigarette. Any suitable tobacco mixture may be used for the cut filler. Examples of suitable types of tobacco materials include flue-cured, Burley, Maryland or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g., burn additives, combustion modifying agents, coloring agents, binders, etc.) known in the art.

The palladium-containing catalysts may be deposited directly on and/or incorporated in a cigarette wrapper before or after the cigarette wrapper is incorporated into a cigarette. Catalytic wrapper and compositions of catalyst-modified web filler can catalyze and/or oxidize the conversion of carbon monoxide to carbon dioxide.

In an embodiment, a palladium-containing catalyst is incorporated in a cigarette wrapper. For example, the catalyst can be incorporated in a cigarette wrapper by spraying or coating onto a wet base web, the intermediate web or the finished web. As discussed above, in situ deposition of a palladium-containing catalyst directly onto a cigarette wrapper can be done via LVCC. In a preferred method, palladium-containing catalyst in the form of a dry powder is physically admixed with the cigarette wrapper during the wrapper manufacturing process. The palladium-containing catalyst can be coated and/or printed to form text or images on the cigarette wrapper within the wrapper-making process. The amount of printing and/or the amount of catalyst can be varied to adjust the level of CO reduction. In a further embodiment, a palladium-containing catalyst is incorporated into the web filler material of a cigarette wrapper, which is used to assemble a cigarette and is consumed during smoking.

The palladium-containing catalysts are capable of converting CO to $CO_2$ at near-ambient temperatures, and therefore can be incorporated in the filter element of a cigarette. The filter may be a mono filter, a dual filter, a triple filter, a single- or multiple-cavity filter, a recessed filter or a free-flow filter. The palladium-containing catalysts can be incorporated into one or more filter parts selected from the group consisting of: shaped wrapper insert, a plug, a space between plugs, cigarette filter wrapper, plug wrap, a cellulose acetate sleeve, a polypropylene sleeve, and a free-flow sleeve. Optionally, cigarette filters can comprise additives such as flavorants or adsorbents.

Figures 2A, 2B:
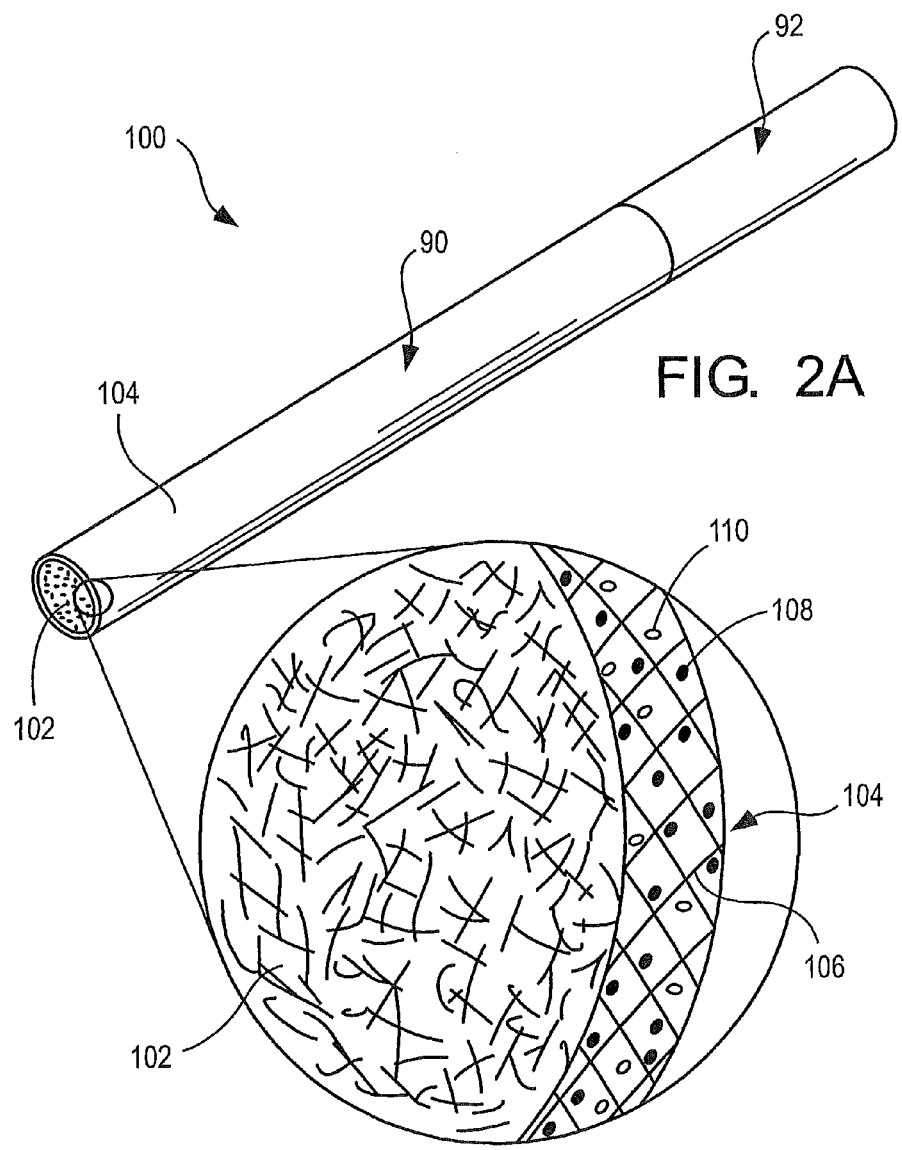
FIG. 2(a) shows an exemplary cigarette with a palladium-containing catalyst supported on the web filler material of the wrapper.
FIG. 2(b) shows a magnified view of the wrapper.

Referring to FIG. 2(a), a preferred embodiment of a smoking article 100 has a tobacco rod portion 90 and filter tip 92. Optionally, embodiments of the smoking article 100 can be practiced without a filter tip 92. Preferably, the tobacco rod portion 90 comprises a column of tobacco 102 that is wrapped with a cigarette wrapper 104. As shown in expanded view in FIG. 2(b), the wrapper 104 includes a web of fibrous cellulosic material 106 in which is dispersed particles of web filler material 108, such as calcium carbonate ($CaCO_3$). In practice, the web filler material 108 serves as an agent for controlling the permeability of the wrapper 104 (measured typically in units of Coresta, which is defined as the amount of air, measured in cubic centimeters, that passes through one square centimeter of material in one minute at a pressure drop of 1.0 kilopascals) and also can serve as a support for the palladium-containing catalyst. If desired, the wrapper 104 can optionally include a catalyst-free web filler material 110.

A cigarette wrapper can be any wrapping suitable for surrounding the cut filler, including wrappers containing flax, hemp, kenaf, esparto grass, rice straw, cellulose and so forth.

Optional filler materials, flavor additives, and burning additives can be included. The wrapper can have more than one layer in cross-section, such as in a bi-layer wrapper as disclosed in commonly-owned U.S. Pat. No. 5,143,098, the entire content of which is herein incorporated by reference.

Figure 3A:
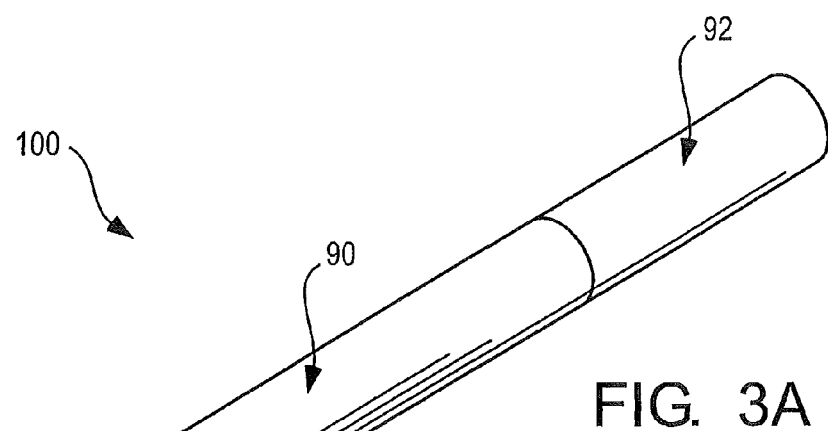
FIG. 3(a) shows an exemplary cigarette with a palladium-containing catalyst supported on the web filler material of a first wrapper with a second outermost wrapper.
Figure 3B:
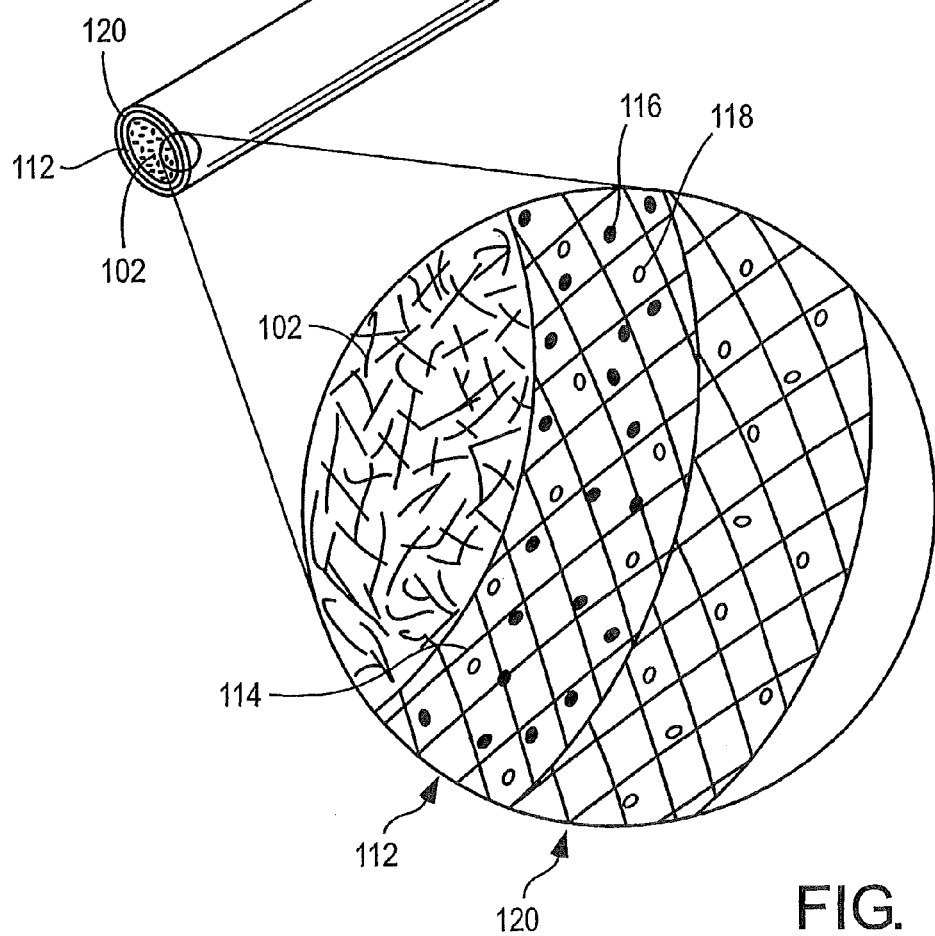
FIG. 3(b) shows a magnified view of the first wrapper with a second outermost wrapper.

FIGS. 3(a) and 3(b) show an embodiment of a cigarette with a palladium-containing catalyst supported on web filler material, the cigarette comprising a first wrapper with a second outermost wrapper. In the FIG. 3(a) embodiment, the smoking article 100 includes a cigarette tobacco column 102 surrounded by a first inner wrapper 112. As shown in expanded view in FIG. 3(b), the first wrapper 112 includes a web 114 and a palladium-containing catalyst supported on web filler material 116. If desired, the first wrapper 112 can optionally include a catalyst-free web filler material 118. The smoking article 100 has a second wrapper 120 surrounding the first wrapper 112. The ratio, in weight percent, of palladium-containing catalyst to web filler material in the first inner wrapper is preferably from about 0.1 to 3.0, more preferably the ratio is about 0.1 to 1.0, and most preferably the ratio is about 0.33 to 1.0. The total amount of palladium-containing catalyst in the second outer wrapper 120 is preferably less than 1 mg for a given single cigarette, more preferably the second wrapper 120 does not include the palladium-containing catalyst so as to provide a cigarette 110 whose appearance is not affected by coloration from the catalyst. In exemplary embodiments, a total amount of palladium-containing catalyst in the first wrapper is 10 to 100 mg and in the second wrapper is less than 1 mg, preferably 0 mg and/or a ratio, in weight percent, of a palladium-containing catalyst in the second wrapper 120 to palladium-containing catalyst in the first wrapper 112 is less than about 0.25.

Figures 4A, 4B:
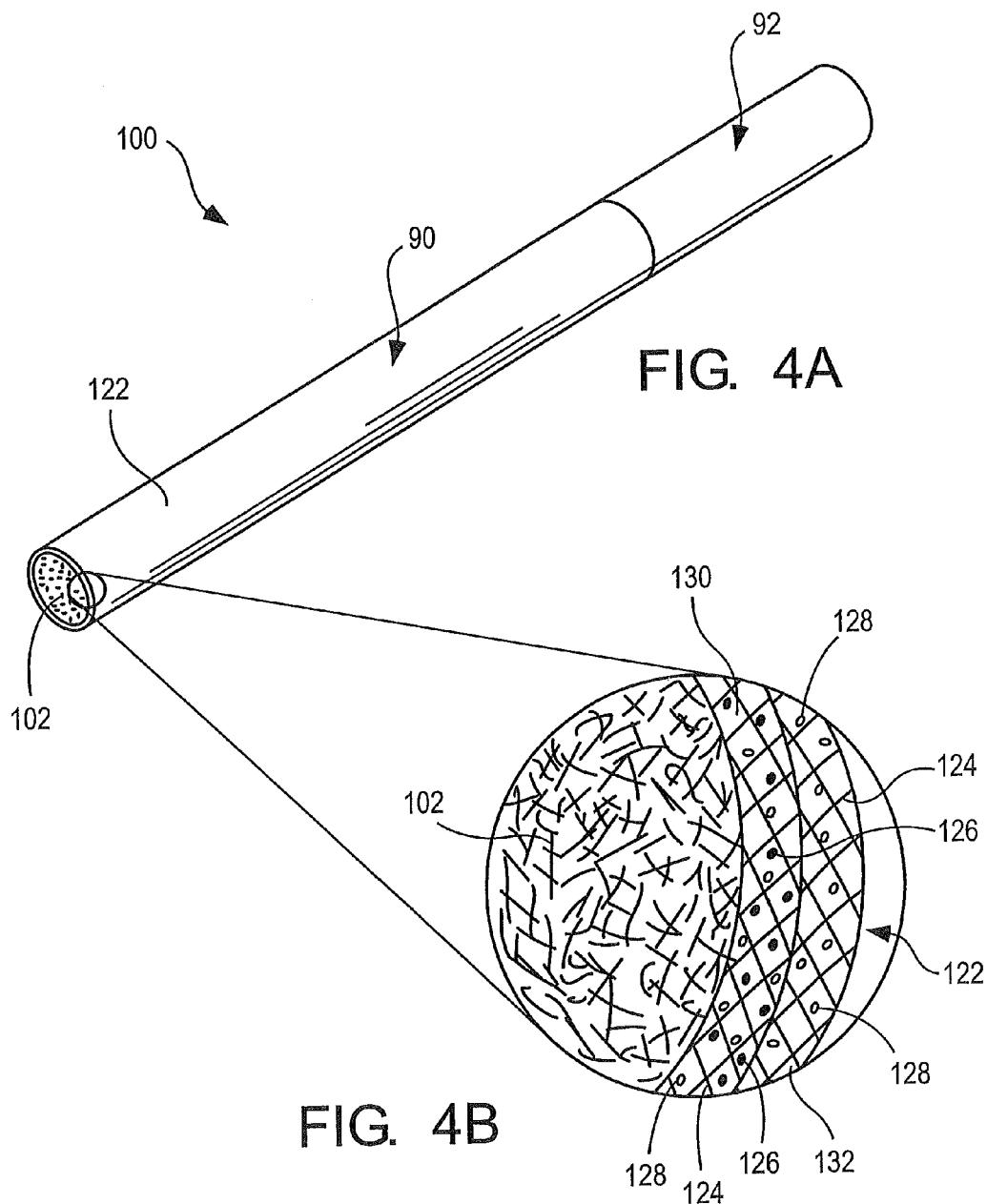
FIG. 4(a) shows an exemplary cigarette with a wrapper including a palladium-containing catalyst. An inner web region of the wrapper contains catalyst supported on web filler material.
FIG. 4(b) shows a magnified view of the wrapper.

FIG. 4(a) shows an embodiment of a smoking article with a wrapper including a palladium-containing catalyst. In the FIG. 4(a) embodiment, the smoking article 100 includes a cigarette tobacco column 102 and a wrapper 122. As shown in expanded view in FIG. 4(b), the wrapper 122 includes a web 124 and a palladium-containing catalyst supported on web filler material 126. If desired, the wrapper 122 can optionally include a catalyst-free web filler material 128. The wrapper 122 has a radially inner portion 130 and a radially outer portion 132, the radially inner portion 130 having a first loading of the palladium-containing catalyst and the radially outer portion 132 having a second loading of the palladium-containing catalyst. In one embodiment, the first loading of the palladium-containing catalyst is greater than the second loading of the palladium-containing catalyst. For example, the first loading of the palladium-containing catalyst in the wrapper for a given single cigarette 100 can be up to 100 mg and the second loading of the nanoparticle carbon monoxide catalyst can be less than 1 mg. Preferably the second loading of the palladium-containing catalyst is zero. In another embodiment, the ratio, in weight percent, of the palladium-containing catalyst to the web filler material in the radially inner portion 130 is preferably from 0.1 to 3.0, more preferably from 0.1 to 1.0, most preferably from 0.33 to 1.0. The total loading of the palladium-containing catalyst in the radially outer portion 132 is preferably less than 1 mg, more preferably zero mg.

The palladium-containing catalysts can be incorporated into cigarette wrapping paper by incorporating the catalyst in filler material utilized as web filler material in the production of the wrapping paper. The web filler material can include an oxide, a carbonate, or a hydroxide of a Group II, Group III or Group IV metal, or the web filler material can be selected from the group consisting of $CaCO_3$, $TiO_2$, $SiO_2$, $Al_2O_3$, $MgCO_3$, $MgO$ and $Mg(OH)_2$. The catalyst-modified web filler preferably comprises nanoscale particles comprising palladium incorporated in and/or on filler particles. In a preferred example, the web filler material is $CaCO_3$ or other conventional filler material used in cigarette wrapper manufacture such as such as ALBACAR® 5970, which is calcium carbonate commercially available from Specialty Minerals of Bethlehem, Pa. If desired, the wrapping paper can include web filler material which does not include the palladium-containing catalyst.

In one method, the palladium-containing catalyst is supported by web filler material by forming an aqueous slurry of the catalyst and the web filler material. The slurry is spread, for example, with a doctor blade, and then dried to evaporate the water leaving behind a solid. The slurry can be dried by exposure to air with or without exposure to a heat source, such as a radiation lamp at about 75° C., or through other methods such as vacuum filtering followed by drying.

The average particle size of the catalyst-modified wrapper web filler can be 0.1 to 10 microns, preferably less than about 2 microns. The catalyst and filler can be provided in any desired ratio, e.g., 10 to 90 wt. % catalyst and 90 to 10 wt. % web filler material. In a preferred embodiment, the level of web filler material in the wrapper (both catalyst-modified web filler and/or web filler material without catalyst, can be from 3 to 50%.

Prior to incorporating the catalyst-modified web filler into the wrapper, optionally the average particle size of the catalyst-modified web filler can be reduced, preferably to an average particle size of from about 0.1 to 10 microns, more preferably to less than about 1 micron. The particle size of the palladium-containing catalyst-modified web filler can be reduced by ball milling, for example, with 1 cm agate milling balls for 2 to 4 hours at 100 to 300 rpm.

Palladium-containing catalyst particles, including catalyst-modified web filler material, can optionally be calcined prior to incorporation into a component of a cigarette. Without wishing to be bound by theory, it is believed that calcination can improve the catalytic activity of the palladium-containing catalyst by removing adsorbed water from the surface of the nanoscale particles. Furthermore, in the case of a catalyst-modified web filler material, calcination may improve adhesion between the catalyst particles and web filler material.

The palladium-containing catalyst can be calcined by heating the catalyst material to a suitable calcining temperature, e.g., up to 500° C., preferably from 200° C. to 400° C., for a suitable period of time such as from 1 to 3 hours, preferably 2 hours.

In a further method, the palladium-containing catalyst (e.g., a nanoscale catalyst and/or catalyst-modified web filler) is incorporated in a cigarette wrapper through conventional wrapper-making processes. For example, the catalyst-modified web filler can be used as all or part of the filler material in the wrapper-making processes or can be distributed directly onto the wrapper, such as by spraying or coating onto wet or dry base web. In production of a smoking article such as a cigarette, the wrapper is wrapped around cut filler to form a tobacco rod portion of the smoking article by a cigarette-making machine, which has previously been supplied or is continuously supplied with tobacco cut filler and one or more ribbons of wrapper.

Palladium-containing catalysts will preferably be distributed throughout the tobacco rod, cigarette filter material and/or the cigarette wrapper portions of a cigarette. By providing the palladium-containing catalyst throughout one or more components of a cigarette it is possible to reduce the amount of carbon monoxide drawn through the cigarette, particularly at the combustion, pyrolysis, condensation and/or filter regions.

The amount of the palladium-containing catalysts can be selected such that the amount of carbon monoxide in mainstream smoke is reduced during smoking of a cigarette. Preferably, the amount of the palladium-containing catalyst will be a catalytically effective amount, e.g., an amount sufficient to catalyze and/or oxidize at least 10% of the carbon monoxide in mainstream smoke, more preferably at least 25%. A total amount of palladium-containing catalyst per cigarette is an amount effective to convert at least some CO to $CO_2$. A preferred amount of the catalyst per cigarette is 1 to 200 mg, 1 to 50 mg or 50 to 100 mg, 2 to 25 mg or 25 to 50 mg, 1 to 15 mg or 15 to 40 mg, or 4 to 10 mg or 10 to 20 mg.

A further embodiment provides a method of making a cigarette comprising the palladium-containing catalyst. Techniques for cigarette manufacture are known in the art. Any conventional or modified cigarette making technique may be used to incorporate the catalyst. The resulting cigarettes can be manufactured to any known specifications using standard or modified cigarette making techniques and equipment. The cut filler composition is optionally combined with other cigarette additives, and provided to a cigarette-making machine to produce a tobacco column, which is then wrapped in a cigarette wrapper, and optionally tipped with filters.

Cigarettes may range from about 50 mm to about 120 mm in length. The circumference is from about 15 mm to about 30 mm in circumference, and preferably around 25 mm. The tobacco packing density is typically between the range of about 100 $mg/cm^3$ to about 300 $mg/cm^3$, and preferably 150 $mg/cm^3$ to about 275 $mg/cm^3$.

Palladium-containing catalysts were analyzed using x-ray diffraction and scanning electron microscopy (SEM). X-Ray diffraction (XRD) patterns were obtained using a Philips X'Pert Materials Research Diffractometer that uses Cu $K_{\alpha 1}$ radiation. The size and shape of catalyst particles were investigated using a JEOL Model JSM-T300 scanning electron microscope and a JEOL Model JEM-200FXII transmission electron microscope.

Figure 5:
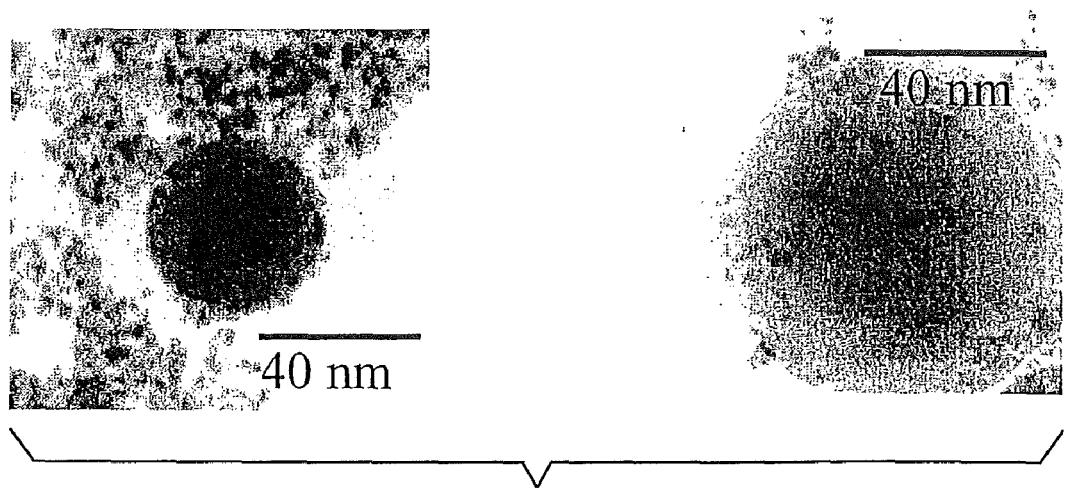
FIG. 5 shows a TEM micrograph for 2:98 (wt. %) palladium:cerium oxide nanoscale catalyst particles.

FIG. 5 shows a TEM image of palladium-cerium oxide (5 wt. % Pd/95 wt. % cerium oxide) nanoscale particles. The size distribution calculated from several TEM images indicates that the majority of the palladium particles have an average particle size in the range of about 5-10 nm. The palladium particles are incorporated on the exterior surface of larger (~40-60 nm) cerium oxide particles.

Figure 6:
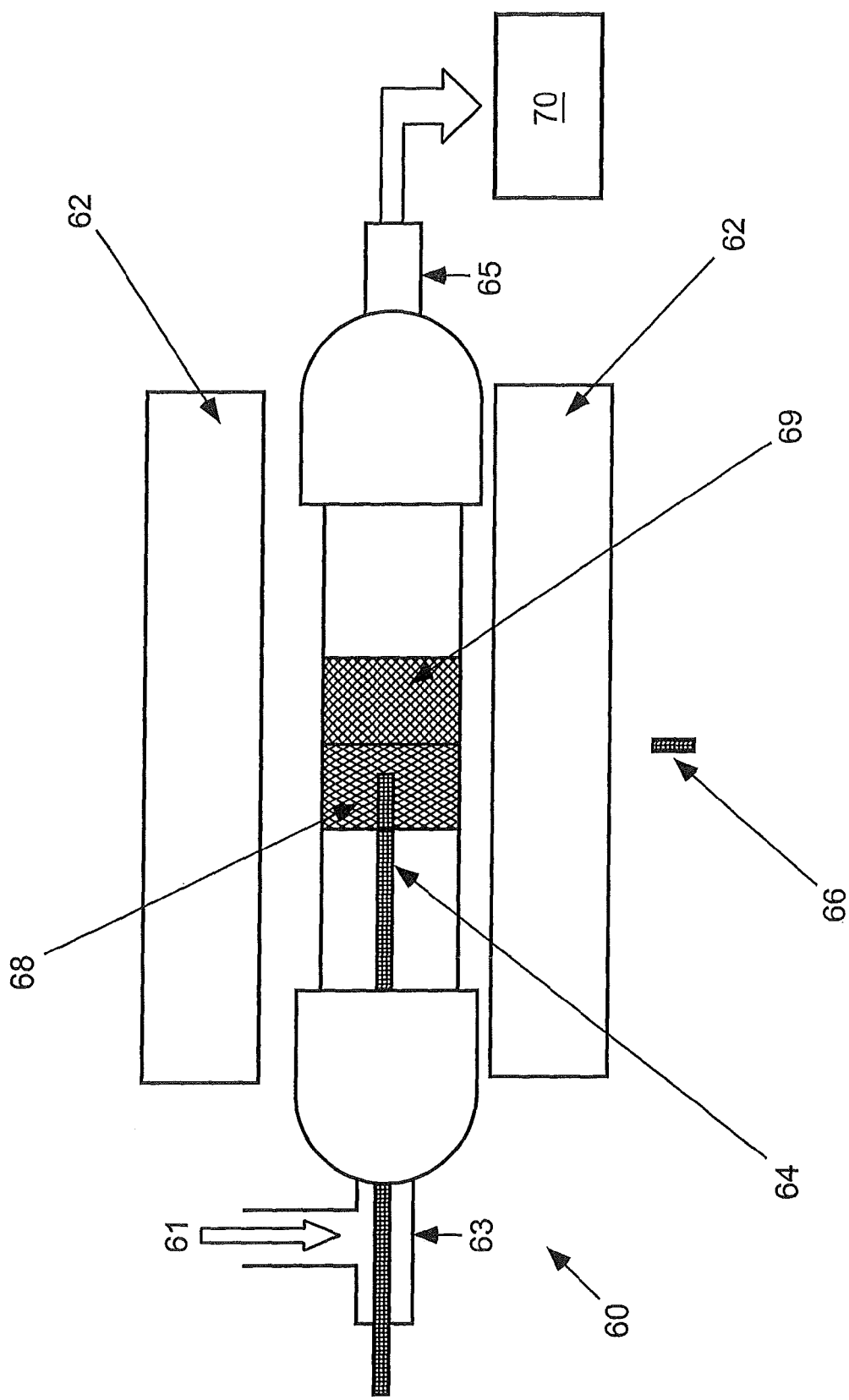
FIG. 6 shows an experimental setup for measuring the activity of palladium-containing nanoscale catalysts.

Palladium and palladium oxide nanoscale particles and nanoscale particles comprising palladium supported on nanoscale particles of aluminum, aluminum oxide, silicon, zirconium oxide, cerium oxide and mixtures thereof were prepared via LVCC. The activity of the palladium-containing catalysts was evaluated using a continuous flow packed bed reactor. An illustration of a packed bed reactor 60 positioned within a programmable tube furnace 62 is shown in FIG. 6. Thermocouples 64 and 66 are used to monitor the temperature of the furnace 62 and of the nanoscale particles within the reactor. To evaluate the ability of the palladium-containing catalyst to reduce the concentration of carbon monoxide, a known mass of the palladium-containing nanoscale particles is dusted onto quartz wool 68 and placed in the middle of the reactor. For the data shown in Tables 1-7 below, the mass of the catalyst samples tested was 10 mg or 40 mg. Data annotated with an asterisk (*) corresponds to 40 mg catalyst samples, and un-annotated data corresponds to 10 mg catalyst samples. A filter pad 69 can be used to prevent particulate material from entering a gas analyzer 70, which is located at a downstream side 65 of the reactor. An input reactant gas mixture 61 comprising about 4% CO and 20% $O_2$ (balance He) is introduced at an upstream side 63 of the reactor and is passed over the particles and through the reactor at atmospheric pressure at a flow rate of about 100 ml/min. After attaining a steady state flow of gas, the temperature of the furnace is increased at a heating rate of about 5° C./min and the gas that passes over the particles and emerges from the downstream side of the reactor is analyzed by a quadrupole mass spectrometer coupled to a data acquisition system. The NLT2000 multi-gas analyzer 70 measures the concentration of CO, $CO_2$ and $O_2$ in the gas.

Data from the multi-gas analyzer was plotted as % CO conversion as a function of furnace temperature. A summary of the carbon monoxide conversion data for several different nanoscale catalyst samples is shown below in Tables 1-7. The data report the temperature at which about 5% of the carbon monoxide is converted to carbon dioxide ($T_5$) and the temperature at which 50% of the carbon monoxide is converted to carbon dioxide ($T_{50}$). The temperature at which about 5% of the carbon monoxide is converted to carbon dioxide is referred to as the light-off temperature. Also shown is the maximum CO to $CO_2$ conversion achieved (measured in %) across the temperature range measured. The temperature at which the maximum percentage conversion is attained is referred to as $T_{max}$.

Figure 7:
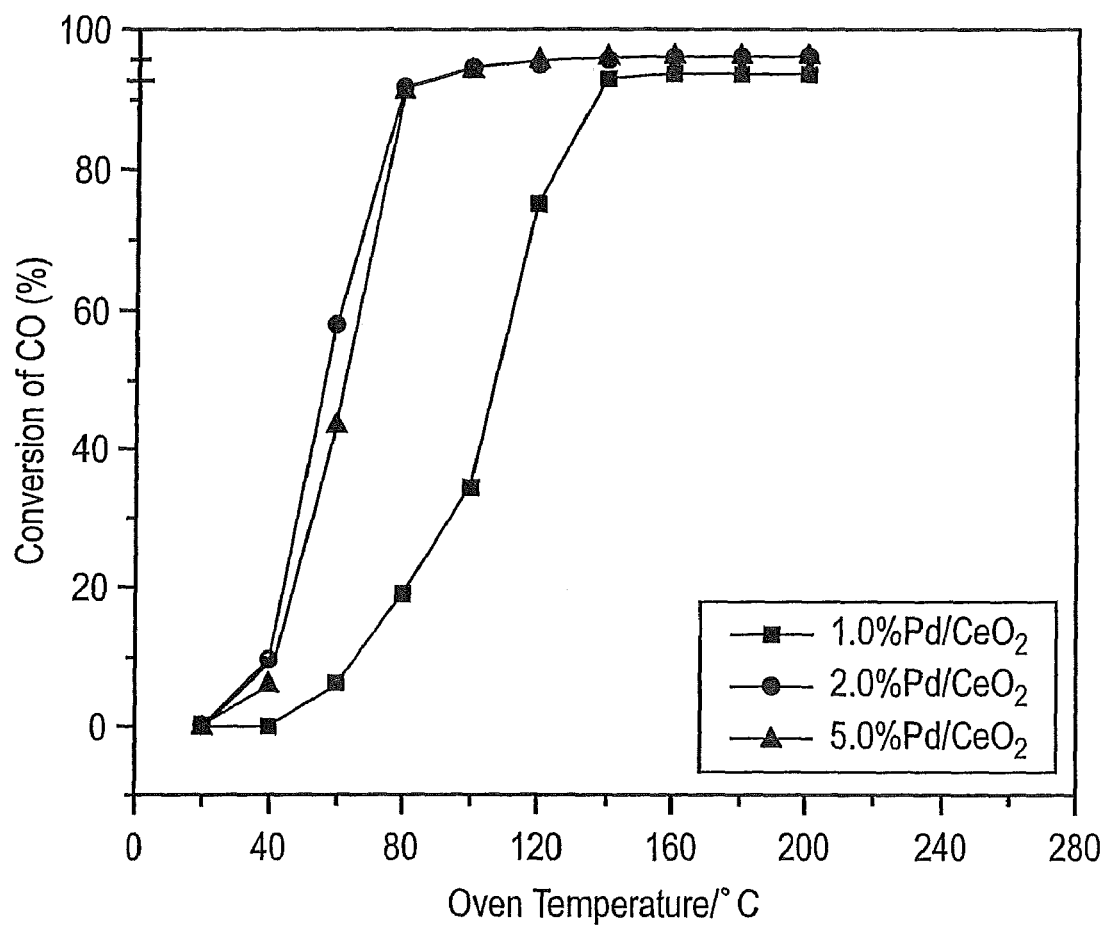
FIG. 7 shows a plot of percent CO conversion as a function of temperature for palladium-containing nanoscale catalysts.

Shown in FIG. 7 is an exemplary plot of % CO conversion for palladium-containing nanoscale catalysts comprising 1, 2 or 5 wt. % palladium on cerium oxide. Data from the plot, which is reported in Table 3, shows that the lowest light-off temperature (31° C.) and temperature corresponding to 50% conversion of CO to $CO_2$ (57° C.) was obtained with a 2 wt. % loading of palladium metal on cerium oxide (sample 6).

For comparison with the activity of the palladium-containing nanoscale catalysts, the activity of bulk (micron-sized) palladium metal powder was measured and is included in Table 1. Data for bulk palladium oxide powders was not measured ("N/A"). Compared with micron-sized particles, the nanoscale particles exhibit lower light-off temperature, lower $T_{50}$ temperature and a higher total conversion of CO to $CO_2$. The bulk data is comparative and illustrates the improvement in catalytic efficiency of the inventive nanoscale catalysts as compared with commercially available powders or physical mixtures thereof.

TABLE 1

| Catalytic Activity for Unsupported Nanoscale and Bulk (micron-sized) Particles | | | | | | |
|---|---|---|---|---|---|---|
| | | Light-off Temp (° C.) | | Temp at 50% Conversion (° C.) | | Maximum % Conversion/ $T_{max}$ (° C.) |
| No. | Sample | Nano | Bulk | Nano | Bulk | Nano | Bulk |
| 1 | Pd | 130 | 170 | 166 | 212 | 85/360 | 82/360 |
| 2 | PdO | 128 | N/A | 164 | N/A | 85/360 | N/A |

Data summarizing the catalytic activity of supported nanoscale particles is shown in Tables 2-7. Carbon monoxide conversion data for nanoscale particles of palladium supported on nanoscale particles of silicon is shown in Table 2. The nanoscale palladium-containing catalyst particles were synthesized via LVCC of a pressed powder target comprising palladium and silicon. Data for bulk (admixed micron-sized) powder samples is shown for comparison. Comparing the bulk sample data to the palladium-containing nanoscale catalyst data, the conversion of at least 5% and 50% of CO to $CO_2$ occurs at lower temperatures for the nanoscale palladium-containing particles.

For nanoscale palladium-silicon catalysts having the same nominal target composition, the addition of 5% $O_2$ to the LVCC process decreases the light-off temperature and the 50% conversion temperature by at least 10%, preferably at least 20%. However, the addition of more than 5% oxygen to the LVCC process does substantially improve the catalytic efficiency.

The catalytic efficiency of the Pd/Si system was improved by increasing the palladium content of the catalysts. By increasing the palladium content from 2 to 50%, the light-off temperature for catalysts synthesized using 0% and 5% $O_2$ was reduced by about 25% and 35%, respectively.

At a temperature of 360° C., a palladium-containing catalyst comprising nanoscale particles of palladium supported on nanoscale particles of silicon can convert at least 80% of CO into $CO_2$.

TABLE 2

Catalytic Activity for Pd Supported on Si

| No. | Sample | Light-off Temp (° C.) | Temp at 50% Conversion (° C.) | Maximum % Conversion/ Temp (° C.) |
|---|---|---|---|---|
| 1 | Pd/Si = 50/50 (bulk) | 185 | 219 | 84/360 |
| 2 | Pd/Si = 50/50, no $O_2$ | 160 | 196 | 85/360 |
| 3 | Pd/Si = 50/50, 5% $O_2$ | 125 | 152 | 89/360 |
| 4 | Pd/Si = 50/50, 25% $O_2$ | 140 | 172 | 84/360 |
| 5 | Pd/Si = 50/50, 50% $O_2$ | 140 | 170 | 83/360 |
| 6 | Pd/Si = 10/90, 25% $O_2$ | 145 | 174 | 85/360 |
| 7 | Pd/Si = 5/95 (bulk) | 223 | 248 | 84/360 |
| 8 | Pd/Si = 5/95, no $O_2$ | 214 | 241 | 86/360 |
| 9 | Pd/Si = 5/95, 5% $O_2$ | 166 | 193 | 87/360 |
| 10 | Pd/Si = 2/98 (bulk) | 243 | 268 | 80/360 |
| 11 | Pd/Si = 2/98, no $O_2$ | 221 | 256 | 85/360 |
| 12 | Pd/Si = 2/98, 5% $O_2$ | 191 | 221 | 85/360 |

Carbon monoxide conversion data for nanoscale particles of palladium supported on nanoscale particles of cerium oxide is shown in Table 3. The nanoscale palladium-containing catalyst particles were synthesized via LVCC of a pressed powder target comprising palladium and cerium oxide. Data for bulk (admixed micron-sized) powder samples is shown for comparison. Comparing the bulk sample data (sample 1) to the palladium-containing nanoscale particle data (samples 2-9), the conversion of at least 5% and 50% of CO to $CO_2$ occurs at substantially lower temperatures for the nanoscale palladium-containing particles.

For nanoscale palladium-ceria catalysts having the same nominal target composition, the addition of 5% $O_2$ to the LVCC process increases the light-off temperature and the 50% conversion temperature. Preferably, the LVCC synthesis of nanoscale palladium-ceria catalysts is performed in an inert (La, non-oxidizing) atmosphere.

At a temperature of 200° C., a palladium-containing catalyst comprising nanoscale particles of palladium supported on nanoscale particles of ceria can convert at least 90%, preferably at least 95%, of CO into $CO_2$.

TABLE 3

Catalytic Activity for Pd Supported on Ceria

| No. | Sample | Light-off Temp (° C.) | Temp at 50% Conversion (° C.) | Maximum % Conversion/ Temp (° C.) |
|---|---|---|---|---|
| 1 | Pd/Ceria = 5/95 (bulk) | 203 | 228 | 88/360 |
| 2 | Pd/Ceria = 5/95, no $O_2$ | 65 | 92 | 90/260 |
| 3 | Pd/Ceria = 5/95, 5% $O_2$ | 81 | 100 | 90/260 |
| 4 | * Pd/Ceria = 5/95, no $O_2$ | 37 | 63 | 96/200 |
| 5 | * Pd/Ceria = 5/95, 5% $O_2$ | 53 | 75 | 95/200 |
| 6 | * Pd/Ceria = 2/98, no $O_2$ | 31 | 57 | 96/200 |
| 7 | * Pd/Ceria = 2/98, 5% $O_2$ | 48 | 71 | 95/200 |
| 8 | * Pd/Ceria = 1/99, no $O_2$ | 56 | 108 | 92/200 |
| 9 | * Pd/Ceria = 1/99, 5% $O_2$ | 58 | 113 | 93/200 |

* The mass of each sample marked by an asterisk (*) is 40 mg. All other samples are 10 mg.

Carbon monoxide conversion data for nanoscale particles of palladium supported on nanoscale particles of zirconium oxide is shown in Table 4. The nanoscale palladium-containing catalyst particles were synthesized via LVCC of a pressed powder target comprising palladium and zirconium oxide. Data for bulk (admixed micron-sized) powder samples is shown for comparison. Comparing the bulk sample data (sample 1) to the palladium-containing nanoscale particle data (samples 2-4), the catalytic efficiency is substantially improved for the nanoscale palladium-containing catalysts.

For a 5 wt. % palladium/95 wt. % zirconia catalyst, the addition of 5% $O_2$ to the LVCC process increases the light-off temperature and the 50% conversion temperature. Thus, the LVCC synthesis of nanoscale palladium-zirconia catalysts is preferably performed in an inert (i.e., non-oxidizing) atmosphere.

At a temperature of 260° C., a palladium-containing catalyst comprising nanoscale particles of palladium supported on nanoscale particles of zirconia can convert at least 90% of CO into $CO_2$.

TABLE 4

Catalytic Activity for Pd Supported on Zirconia

| No. | Samples | Light-off Temp (° C.) | Temp at 50% Conversion (° C.) | Maximum % Conversion/ Temp (° C.) |
|---|---|---|---|---|
| 1 | Pd/Zirconia = 5/95 (bulk) | 204 | 229 | 89/360 |
| 2 | Pd/Zirconia = 5/95, no $O_2$ | 95 | 121 | 90/260 |
| 3 | Pd/Zirconia = 5/95, 5% $O_2$ | 127 | 150 | 89/260 |
| 4 | *Pd/Zirconia = 2/98, no $O_2$ | 81 | 108 | 92/200 |

*The mass of each sample marked by an asterisk (*) is 40 mg. All other samples are 10 mg.

Carbon monoxide conversion data for nanoscale particles of palladium supported on nanoscale particles of cerium oxide and zirconium oxide is shown in Table 5. The data shown in Table 5 corresponds to palladium-containing catalysts comprising a mixed oxide support, i.e., the support comprises nanoscale particles of both cerium oxide and zirconium oxide. The Pd/Ceria-Zirconia samples were synthesized via LVCC from a pressed powder target comprising palladium metal, cerium oxide and zirconium oxide. Data for bulk (admixed micron-sized) powder samples is shown for comparison. Comparing the bulk sample data (samples 1, 4, 7 and 10) to the nanoscale mixed oxide support catalyst data, the catalytic efficiency is substantially improved for the nanoscale palladium-containing catalysts.

For nanoscale palladium-ceria-zirconia catalysts having the same nominal target composition, the addition of 5% $O_2$ to the LVCC process increases the light-off temperature and the 50% conversion temperature. Preferably, the LVCC synthesis of nanoscale palladium-ceria-zirconia catalysts is performed in an inert (i.e., non-oxidizing) atmosphere.

Increasing the ceria content in the palladium-containing mixed oxide nanoscale catalysts decreases the light-off temperature and the 50% conversion temperature. For samples comprising 5 wt. % Pd, increasing the ceria content from 20 wt. % to 100 wt. % decreases the light off and $T_{50}$ temperature by at least 35% for samples made in an atmosphere containing either 0% $O_2$ or 5% $O_2$.

At a temperature of 360° C., a palladium-containing catalyst comprising nanoscale particles of palladium supported on nanoscale particles of ceria and nanoscale particles of zirconia can convert at least 75% of CO into $CO_2$. More preferably, a palladium-ceria-zirconia catalyst can convert at least 90% of CO into $CO_2$ at a temperature of 300° C., most preferably at a temperature of 200° C.

TABLE 5

Catalytic Activity for Pd Supported on Zirconia/Ceria

| No. | Sample (Pd/Ceria/Zirconia) (wt. %) | Light-off Temp (° C.) | Temp at 50% Conversion (° C.) | Maximum % Conversion/ Temp (° C.) |
|---|---|---|---|---|
| 1 | 10/45/45 (bulk) | 203 | 225 | 85/360 |
| 2 | 10/45/45, no $O_2$ | 78 | 99 | 87/260 |
| 3 | 10/45/45, 5% $O_2$ | 84 | 111 | 86/260 |
| 4 | 5/47.5/47.5 (bulk) | 218 | 270 | 78/460 |
| 5 | 5/47.5/47.5, no $O_2$ | 86 | 137 | 77/360 |
| 6 | 5/47.5/47.5, 5% $O_2$ | 106 | 157 | 78/360 |
| 7 | 5/75/20 (bulk) | 222 | 271 | 78/460 |
| 8 | 5/75/20, no $O_2$ | 81 | 132 | 79/360 |
| 9 | 5/75/20, 5% $O_2$ | 86 | 145 | 77/360 |
| 10 | 5/20/75 (bulk) | 229 | 290 | 75/460 |
| 11 | 5/20/75, no $O_2$ | 105 | 155 | 76/360 |
| 12 | 5/20/75, 5% $O_2$ | 127 | 182 | 76/360 |
| 13 | * 2/49/49, no $O_2$ | 50 | 71 | 94/200 |
| 14 | * 2/49/49, 5% $O_2$ | 57 | 76 | 94/300 |
| 15 | * 2/74/24, no $O_2$ | 47 | 71 | 96/200 |
| 16 | * 2/74/24, 5% $O_2$ | 51 | 71 | 95/300 |

* The mass of each sample marked by an asterisk (*) is 40 mg. All other samples are 10 mg.

Carbon monoxide conversion data for nanoscale particles of palladium supported on nanoscale particles of aluminum or nanoscale particles of aluminum oxide is shown in Tables 6 and 7 respectively. The nanoscale palladium-containing catalyst particles were synthesized via LVCC of a pressed powder target comprising palladium and aluminum (Table 6) or palladium and aluminum oxide (Table 7).

The addition of 5% $O_2$ to the LVCC process decreases the light-off temperature and the 50% conversion temperature for 5 wt. % palladium/95 wt. % aluminum nanoscale catalysts. However, the addition of 5% $O_2$ to the LVCC process increases the light-off temperature and the 50% conversion temperature for 5 wt. % palladium/95 wt. % aluminum oxide nanoscale catalysts.

At a temperature of 460° C., a palladium-containing catalyst comprising nanoscale particles of palladium supported on nanoscale particles of aluminum or nanoscale particles of alumina can convert at least 70% of CO to $CO_2$.

TABLE 6

Catalytic Activity for Pd Supported on Aluminum

| No. | Sample | Light-off Temp (° C.) | Temp at 50% Conversion (° C.) | Maximum % Conversion/ Temp (° C.) |
|---|---|---|---|---|
| 1 | Pd/Al = 5/95 (bulk) | 253 | 316 | 73/460 |
| 2 | Pd/Al = 5/95, no O2 | 212 | 269 | 74/460 |
| 3 | Pd/Al = 5/95, 5% O2 | 192 | 248 | 76/460 |

TABLE 7

Catalytic Activity for Pd Supported on Aluminum Oxide

| No. | Sample | Light-off Temp (° C.) | Temp at 50% Conversion (° C.) | Maximum % Conversion/ Temp (° C.) |
|---|---|---|---|---|
| 1 | Pd/Alumina = 5/95 (bulk) | 250 | 326 | 73/460 |
| 2 | Pd/Alumina = 5/95, no $O_2$ | 174 | 236 | 78/460 |
| 3 | Pd/Alumina = 5/95, 5% $O_2$ | 189 | 255 | 75/460 |
| 4 | *Pd/Alumina = 2/98, no $O_2$ | 161 | 179 | 90/260 |

*The mass of each sample marked by an asterisk (*) is 40 mg. All other samples are 10 mg.

A dried sample of a 5% Pd-cerium oxide nanoscale catalyst was dusted onto cut filler that was formed into a test cigarette. A control cigarette, which was catalyst-free, and the test cigarette, which contained 50 mg of the catalyst, were smoked using an electric smoking machine that drew air through the lit cigarette in puffs of 2 sec. duration and 35 ml of air/puff. By incorporating the palladium-containing catalyst in the cut filler of the cigarette, the carbon monoxide concentration and the nitric oxide concentration in the cigarette mainstream smoke were reduced. In comparing the test cigarette to the control cigarette, the amount of carbon monoxide was decreased from about 13 mg to about 6 mg (54% reduction) and the amount of nitric oxide was decreased from about 270 micrograms to about 165 micrograms (39% reduction).

The palladium-containing nanoscale catalysts may be used in a variety of applications. For example, the catalyst may be incorporated into one or more components of a cigarette (e.g., tobacco cut filler, cigarette paper and/or cigarette filters) such that during smoking of the cigarette the concentration of carbon monoxide in mainstream and/or sidestream smoke is reduced. The catalyst may be incorporated into a hydrocarbon conversion reactor in an amount effective to convert hydrocarbons. The catalyst may be incorporated into a vehicle exhaust emissions system in an amount effective to oxidize carbon monoxide to carbon dioxide. The catalyst may also be used for emissions reduction in the cold starting of an automobile engine in an amount effective to oxidize carbon monoxide to carbon dioxide. In another embodiment, the catalyst may be incorporated into a carbon dioxide laser in an amount effective to oxidize carbon monoxide to carbon dioxide. In another embodiment, the catalyst can be incorporated into a fuel cell in an amount effective to oxidize carbon monoxide to carbon dioxide. In yet another embodiment, the catalyst can be used in an air filter for the conversion of carbon monoxide and/or indoor volatile organic compounds.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

All of the above-mentioned references are herein incorporated by reference in their entirety to the same extent as if each individual reference was specifically and individually indicated to be incorporated herein by reference in its entirety.

What is claimed is:

1. A method of making a cigarette comprising a palladium-containing nanoscale catalyst comprising placing a starting material in a reaction chamber, subjecting the starting material to a beam of laser energy to form a vapor and condensing the vapor so as to form first nanoscale particles and second nanoscale particles, wherein the first nanoscale particles comprise palladium and/or an oxide of palladium, the second nanoscale particles comprise an element other than palladium, and the first nanoscale particles are supported on the second nanoscale particles to form the palladium-containing nanoscale catalyst, the method further comprising the steps of:
   (i) incorporating the palladium-containing nanoscale catalyst in and/or on at least one of tobacco cut filler, a cigarette wrapper comprising web-filler material and a cigarette filter comprising filter material;
   (ii) providing the tobacco cut filler to a cigarette making machine to form a tobacco column; and
   (iii) placing the cigarette wrapper around the tobacco column to form a tobacco rod of a cigarette.

2. The method according to claim 1, further comprising:
   (a) heating the palladium-containing nanoscale catalyst at a temperature of at least about 200° C. prior to incorporating the catalyst in and/or on the at least one of tobacco cut filler, cigarette wrapper and cigarette filter;
   (b) heating the palladium-containing nanoscale catalyst in an atmosphere comprising oxygen to oxidize the nanoscale particles of palladium and/or oxidize the second nanoscale particles prior to incorporating the catalyst in and/or on the at least one of tobacco cut filler, cigarette wrapper and cigarette filter; and/or
   (c) heating the palladium-containing nanoscale catalyst in an atmosphere comprising argon and about 20% oxygen to oxidize the nanoscale particles of palladium and/or oxidize the second nanoscale particles prior to incorporating the catalyst in and/or on the at least one of tobacco cut filler, cigarette wrapper and cigarette filter.

3. The method according to claim 1, wherein:
   (a) the palladium-containing nanoscale catalyst is capable of acting as both as a catalyst and as an oxidant for the conversion of carbon monoxide to carbon dioxide;
   (b) the palladium-containing nanoscale catalyst is incorporated in an amount effective to convert at least 5% of the carbon monoxide in mainstream tobacco smoke to carbon dioxide and/or convert at least 5% of the nitric oxide in mainstream tobacco smoke to nitrogen;
   (c) the palladium-containing nanoscale catalyst is incorporated in an amount effective to convert at least 50% of the carbon monoxide in mainstream tobacco smoke to carbon dioxide;
   (d) the palladium-containing nanoscale catalyst is incorporated in an amount effective to convert at least 5% of the carbon monoxide in mainstream tobacco smoke to carbon dioxide at a temperature of less than about 225° C. and convert at least 50% of the carbon monoxide in mainstream tobacco smoke to carbon dioxide at a temperature of less than about 260° C.;
   (e) the palladium-containing nanoscale catalyst is incorporated in an amount effective to convert at least 5% of the carbon monoxide in mainstream tobacco smoke to carbon dioxide at a temperature of less than about 75° C. and convert at least 50% of the carbon monoxide in mainstream tobacco smoke to carbon dioxide at a temperature of less than about 125° C.;
   (f) the palladium-containing nanoscale catalyst is incorporated along the length of the tobacco rod;
   (g) the step of incorporating includes spraying, dusting or immersion;
   (h) the step of incorporating comprises depositing the palladium-containing nanoscale catalyst from the gas phase directly on at least one of the tobacco cut filler, cigarette wrapper and cigarette filter material;
   (i) the step of incorporating comprises combining the palladium-containing nanoscale catalyst and at least one of the tobacco cut filler, cigarette wrapper and cigarette filter material in the absence of a liquid;
   (j) the total amount of palladium-containing nanoscale catalyst in the cigarette wrapper is up to about 100 mg per cigarette;
   (k) the wrapper is a first wrapper and the method further comprises placing a second wrapper around the tobacco rod portion; and/or
   (l) the palladium-containing nanoscale catalyst is incorporated in a cigarette wrapper by spraying or coating onto a wet base web, intermediate web or finished web.

4. The method according to claim 1, further comprising forming a palladium-containing nanoscale catalyst-modified web-filler material and incorporating the catalyst-modified web filler material into the cigarette wrapper before placing the cigarette wrapper around the tobacco column.

5. The method according to claim 4, wherein the ratio, in weight percent, of the palladium-containing nanoscale catalyst to the web-filler material in the cigarette wrapper is from about 0.1 to 3.

6. The method according to claim 1, wherein the wrapper is a first wrapper and the method further comprises placing a second wrapper around the tobacco rod portion, and further wherein:
   (a) the second wrapper is radially outward from the first wrapper;
   (b) the total amount of palladium-containing nanoscale catalyst in the second wrapper is zero; and/or
   (c) the ratio, in weight percent, of palladium-containing catalyst to web-filler material in the second wrapper is less than about 0.1.

7. The method according to claim 4, wherein the palladium-containing catalyst is incorporated in the web-filler material by forming an aqueous slurry of the palladium-containing catalyst and the web-filler material and drying the slurry to form the catalyst modified web-filler.

8. The method according to claim 4, further comprising calcining the catalyst modified web filler prior to step (i).

9. The method according to claim 4, wherein the palladium-containing nanoscale catalyst is incorporated in the web-filler material by forming an aqueous slurry of the palladium-containing catalyst and the web-filler material, drying the slurry to form agglomerates of the catalyst modified web-filler, reducing an average particle size of the agglomerates, and optionally calcining the catalyst modified web-filler prior to step (i).

10. A cigarette comprising a tobacco rod, cigarette wrapper and an optional filter, wherein at least one of the tobacco rod, cigarette wrapper and filter comprise a palladium-containing nanoscale catalyst, the palladium-containing nanoscale catalyst comprising palladium and/or palladium oxide nanoscale particles incorporated in and/or on nanoscale support particles comprising an element selected from the group consisting of aluminum, silicon, zirconium and cerium;

Wherein said first nanoscale particles have an average particle size of less than about 100 nm and second nanoscale particles have an average particle size of less than about 100 nm.

11. The cigarette of claim 10, wherein:
(a) the palladium-containing nanoscale catalyst comprises from about 1 to 99% by weight palladium;
(b) the palladium-containing nanoscale catalyst comprises from about 2 to 50% by weight palladium;
(c) the palladium-containing nanoscale catalyst comprises about 5% by weight palladium;
(d) the first nanoscale particles have an average particle size of less than about 10 nm and second nanoscale particles have an average particle size of less than about 100 nm;
(e) the palladium-containing catalyst comprises particles having an average particle size of less than about 100 nm;
(f) second nanoscale particles comprise elemental aluminum or elemental silicon;
(g) second nanoscale particles comprise aluminum oxide, cerium oxide and/or zirconium oxide;
(h) the palladium-containing nanoscale catalyst is capable of acting as both as a catalyst and as an oxidant for the conversion of carbon monoxide to carbon dioxide;
(i) the palladium-containing nanoscale catalyst is incorporated in an amount effective to convert at least 5% of the carbon monoxide in mainstream tobacco smoke to carbon dioxide and/or convert at least 5% of the nitric oxide in mainstream tobacco smoke to nitrogen;
(j) the palladium-containing nanoscale catalyst is incorporated in an amount effective to convert at least 50% of the carbon monoxide in mainstream tobacco smoke to carbon dioxide;
(k) the palladium-containing nanoscale catalyst is incorporated in an amount effective to convert at least 5% of the carbon monoxide in mainstream tobacco smoke to carbon dioxide at a temperature of less than about 225° C. and convert at least 50% of the carbon monoxide in mainstream tobacco smoke to carbon dioxide at a temperature of less than about 260° C.;
(l) the palladium-containing nanoscale catalyst is incorporated in an amount effective to convert at least 5% of the carbon monoxide in mainstream tobacco smoke to carbon dioxide at a temperature of less than about 75° C. and convert at least 50% of the carbon monoxide in mainstream tobacco smoke to carbon dioxide at a temperature of less than about 125° C.;
(m) the palladium-containing nanoscale catalyst is incorporated along the length of the tobacco rod;
(n) the cigarette wrapper comprises a web-filler material and the ratio, in weight percent, of the palladium-containing nanoscale catalyst to the web-filler material in the cigarette wrapper is from about 0.1 to 3;
(o) the total amount of palladium-containing nanoscale catalyst in the cigarette wrapper is up to about 100 mg per cigarette; and/or
(p) the wrapper is a first wrapper and the cigarette further comprises a second wrapper around the tobacco rod portion.

12. The cigarette of claim 10, wherein the wrapper is a first wrapper and the cigarette further comprises a second wrapper around the tobacco rod portion and further wherein:
(a) the second wrapper is radially outward from the first wrapper;
(b) the total amount of palladium-containing nanoscale catalyst in the second wrapper is zero; and/or
(c) the ratio, in weight percent, of palladium-containing catalyst to web-filler material in the second wrapper is less than about 0.1.

13. A method of oxidizing carbon monoxide to carbon dioxide comprising contacting palladium-containing nanoscale catalyst particles produced by the method according to claim 1 with a gas containing carbon monoxide, the gas being selected from the group consisting of mainstream and/or sidestream cigarette smoke, vehicle exhaust emission, a gas used in a laser, a gas used in a fuel cell, and ambient air undergoing air filtration.

* * * * *